United States Patent
Ikezoye et al.

(10) Patent No.: US 11,288,302 B2
(45) Date of Patent: Mar. 29, 2022

(54) TEMPORAL FRACTION WITH USE OF CONTENT IDENTIFICATION

(71) Applicant: Audible Magic Corporation, Los Gatos, CA (US)

(72) Inventors: Vance Ikezoye, Los Gatos, CA (US); Jay Friedman, Monte Sereno, CA (US); Erling Wold, San Francisco, CA (US); Michael Thomas Edwards, London (GB)

(73) Assignee: Audible Magic Corporation, Los Gatos, CA (US)

(*) Notice: Subject to any disclaimer, the term of this patent is extended or adjusted under 35 U.S.C. 154(b) by 0 days.

(21) Appl. No.: 16/786,866

(22) Filed: Feb. 10, 2020

(65) Prior Publication Data

US 2020/0175055 A1    Jun. 4, 2020

Related U.S. Application Data

(63) Continuation of application No. 15/726,278, filed on Oct. 5, 2017, now Pat. No. 10,599,702.

(51) Int. Cl.
| | |
|---|---|
| *G06F 16/43* | (2019.01) |
| *G06F 9/455* | (2018.01) |
| *G06Q 30/04* | (2012.01) |
| *H04N 21/8352* | (2011.01) |
| *H04N 21/254* | (2011.01) |
| *G06F 16/683* | (2019.01) |
| *H04N 21/2743* | (2011.01) |

(52) U.S. Cl.
CPC .......... *G06F 16/43* (2019.01); *G06F 9/45558* (2013.01); *G06F 16/683* (2019.01); *G06Q 30/04* (2013.01); *H04N 21/2541* (2013.01); *H04N 21/2743* (2013.01); *H04N 21/8352* (2013.01); *G06F 2009/45595* (2013.01)

(58) Field of Classification Search
CPC . G06F 16/433; G06F 16/683; H04N 21/2541; H04N 21/2743; H04N 21/8352
See application file for complete search history.

(56) References Cited

U.S. PATENT DOCUMENTS

| | | | |
|---|---|---|---|
| 5,918,223 | A | 6/1999 | Blum et al. |
| 6,834,308 | B1 | 12/2004 | Ikezoye et al. |
| 6,968,337 | B2 | 11/2005 | Wold |
| 7,363,278 | B2 | 4/2008 | Schmelzer et al. |
| 7,562,012 | B1 | 7/2009 | Wold et al. |
| 8,006,314 | B2 | 8/2011 | Wold |

(Continued)

FOREIGN PATENT DOCUMENTS

| | | |
|---|---|---|
| EP | 2017827 A1 | 1/2009 |
| WO | 2006012241 A2 | 2/2006 |

OTHER PUBLICATIONS

European Patent Office, Extended European Search Report for European Patent Application No. 18198135.8 dated Nov. 22, 2018, 9 pages.

*Primary Examiner* — A. Hunter Wilder

(74) *Attorney, Agent, or Firm* — Lowenstein Sandler LLP

(57) ABSTRACT

A media item may be received by a computing device. One or more works may be identified in the media item. One or more ratios may be determined based on the length of the media item and/or lengths of one or more identified works in the media item. An output may be determined based on the one or more ratios.

19 Claims, 8 Drawing Sheets

(56) References Cited

U.S. PATENT DOCUMENTS

| | | |
|---|---|---|
| 8,130,746 B2 | 3/2012 | Schrempp |
| 8,332,326 B2 | 12/2012 | Schrempp et al. |
| 8,972,481 B2 | 3/2015 | Schrempp et al. |
| 2002/0083060 A1* | 6/2002 | Wang .................. G10L 17/26 |
| 2008/0228733 A1 | 9/2008 | Davis et al. |
| 2010/0232765 A1 | 9/2010 | Suginohara et al. |
| 2010/0263020 A1 | 10/2010 | Harrison et al. |
| 2015/0234814 A1 | 8/2015 | Ikezoye et al. |
| 2016/0261917 A1* | 9/2016 | Trollope .............. H04N 21/475 |
| 2017/0201774 A1 | 7/2017 | Lindsay et al. |
| 2017/0323145 A1 | 11/2017 | Kenyon et al. |

\* cited by examiner

TEMPORAL FRACTION WITH USE OF CONTENT IDENTIFICATION

RELATED APPLICATIONS

This patent application is a continuation of U.S. patent application Ser. No. 15/726,278, filed Oct. 5, 2017, which is herein incorporated by reference.

TECHNICAL FIELD

This disclosure relates to the field of media content identification and resource allocation based on temporal fraction of works within media items.

BACKGROUND

A growing population of users enjoys entertainment through the consumption of media items hosted on media content sharing platforms. The media items include electronic media, such as digital audio and video, podcasts, etc. Users of the media content sharing platform may upload media items (e.g., user generated content) for the enjoyment of the other users. Some users upload content to the media content sharing platform that includes known works of content owners. Currently, resources are split equally among all content owners of known works in a media item, regardless of the duration of each known work within the media item. Additionally, media items containing any segments of unauthorized work may be removed from the media content platform regardless of the percentage of the length of the unauthorized work to the length of the media item. The process of equally splitting resources among content owners and the strict compliance logic, despite the length of the respective work, is neither fair nor efficient. The identification of known works is also time consuming and requires a substantial investment into computing/processing power and communication bandwidth.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
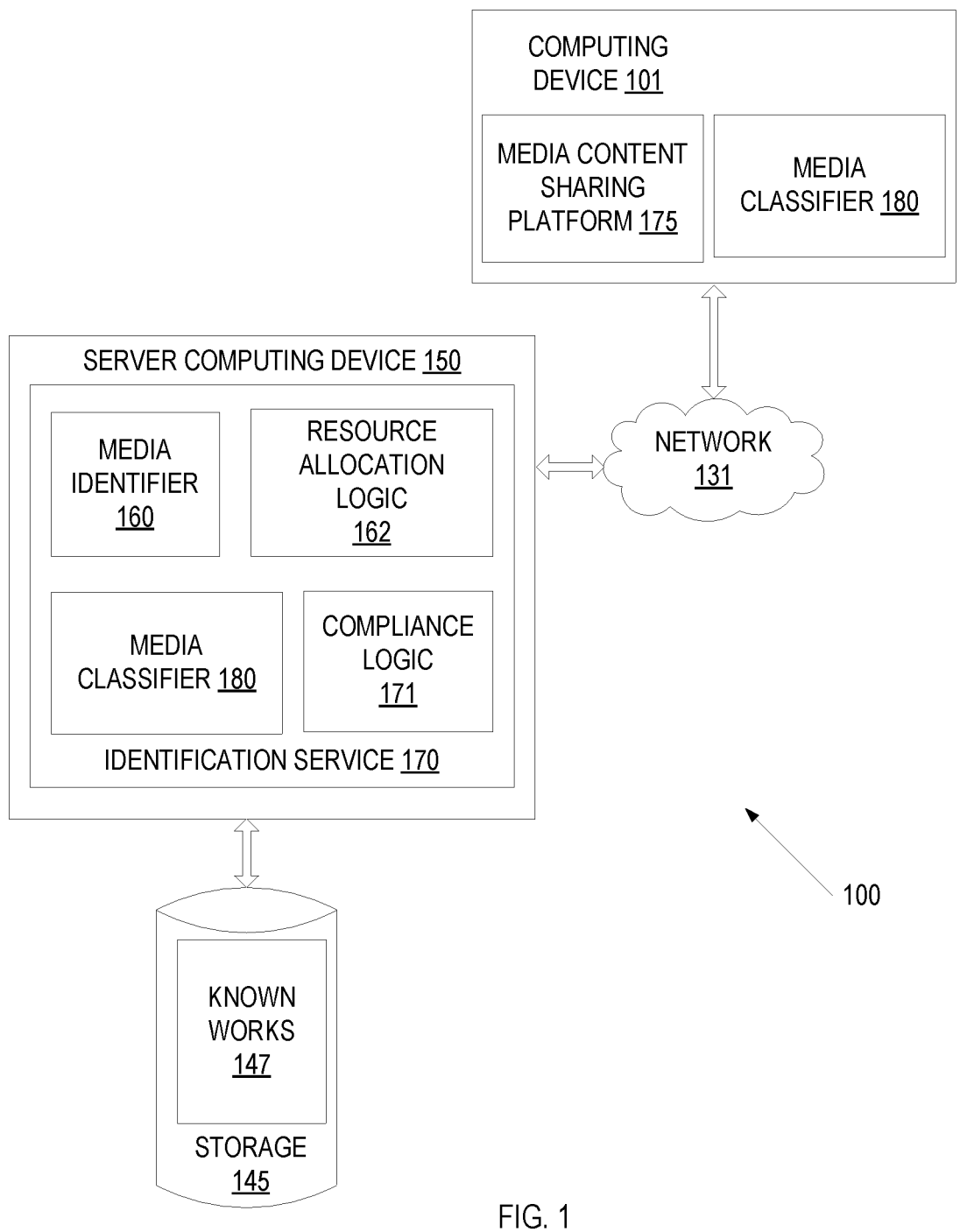
FIG. 1 is a block diagram illustrating a network environment in which embodiments of the present invention may operate.

Embodiments are described for splitting resources (e.g., royalties) among content owners of media contents within media items based on the length of each owner's content in the media items. A media item may be audio (e.g., a song or album), a video, or other type of media. Media items may be files (e.g., audio files having formats such as WAV, AIFF, AU, FLAC, ALAC, MPEG-4, MP3, Opus, Vorbis, AAC, ATRAC, WMA, and so on, or video files having formats such as WebM, Flash Video, F4V, Vob, Ogg, Dirac, AVI, QuickTime File Format, Windows Media Video, MPEG-4, MPEG-1, MPEG-2, M4V, SVI, MP4, FLV, and so on). Media items may also be live streams of video and/or audio media, broadcasts of video and/or audio media, and/or downloads of video and/or audio media. In embodiments, one or more works within media items are identified and for each work a ratio of a first value based on the length of the work to a second value based on the length of the media item is determined. Based on the determined ratios, resource distribution may be determined. For example, royalty rates payable to content owners may be assigned based on the determined ratios. Additionally, based on the determined ratios a decision regarding the compliance of the media item may be determined.

Popularity of media content sharing platforms is ever increasing. The user bases for popular media content sharing platforms have already expanded to over a billion users. An active set of these users is uploading user generated content. User generated content (UGC) may include the work of another that is subject to copyright protections (e.g., video or audio known works). Today many pieces of content are available to be viewed both offline and online through a diverse collection of media content sharing platforms. In one common case, a media content sharing platform will monetize an instance of media items during the presentation of the media items to end users. Monetization of media items includes displaying other content such as advertisements and/or promotional media alongside, before, or after presenting the media item. Interested parties, such as a content sharing platform, a user uploading the media item, a media content owner, or a media content publisher may wish to determine whether the media item is or includes a known work so that licensing and royalty rates may be applied for the media item and/or the media item can be removed from the media content sharing platform.

A media identification service may receive the media item for processing locally or remotely over a network. The media identification service may then analyze the media content to identify one or more works included in the media item. The relative lengths of these works in the media item to each other and the relative lengths of these works to the total length of the media content may be used to determine resource allocation. For example, these relative lengths may be used to determine royalty rates payable to rights holders for each of the identified works and/or to determine whether the media content should be removed from the media content sharing platform.

Some existing services analyze a continuous broadcast stream and identify works such as songs within that broadcast stream. This enables those services to track the number of times that particular works are played on the broadcast stream. However, such services do not make any determination as to a total length of a media item. Moreover, since a continuous stream is processed, there may be no defined start or end of a media item to use for measuring a length of a media item. Accordingly, such services are not capable of determining any ratio of a length of a work to a length of a media item containing the work. Nor do such services determine any ratio of a ratio of a length of a first work in a media item to a length of a second work in a media item.

In one embodiment, a media item may be received by a computing device and one or more classes of may be identified in the media item using a classification profile. For example, segments of the media item that contain music may be identified. One or more ratios may be determined based on the length of the media item and/or lengths of segments in the media item that have a particular class (e.g., that contain music). Resource allocation may be determined based on the one or more ratios meeting or exceeding a certain threshold.

In another embodiment, a media item may be received by a computing device and a plurality of works may be identified in the media item using an identification service. One or more ratios may be determined based on a combination of the length of the media item, the length of each work of the plurality of identified works, and/or the total length of the plurality of identified works. Royalty rates to content owners of the identified works as well as compliance decisions for the media item may be determined based on the one or more ratios meeting or exceeding a certain threshold.

FIG. 1 is a block diagram illustrating a network environment 100 in which embodiments of the present invention may operate. In one embodiment, network environment 100 includes one or more computing devices (e.g., computing device 101 and server computing device 150), and network 131 over which computing device 101 and server computing device 150 may communicate. Any number of computing devices 101 can communicate with each other and/or with server computing device 150 through network 131. The network 131 can include a local area network (LAN), a wireless network, a telephone network, a mobile communications network, a wide area network (WAN) (e.g., such as the Internet) and/or similar communication system. The network 131 can include any number of networking and computing devices such as wired and wireless devices.

The computing device 101 and server computing device 150 may include a physical machine and/or a virtual machine hosted by a physical machine. The physical machine may be a rackmount server, a desktop computer, or other computing device. In one embodiment, the computing device 101 and/or server computing device 150 can include a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

Network environment 100 includes one or more computing devices 101 for implementing one or more media content sharing platforms 175 which receive user uploads of user generated content. Such user generated content may then be accessible to other users. User generated content includes media items that have been uploaded to the media content sharing platform. Such media items may include copyrighted material in many instances.

The media content sharing platform 175 may engage with a media identification service 170 hosted by server computing device 150. After a media item is uploaded to the media content sharing platform 175, the computing device 101 may provide the media item to the server computing device 150 for identification by identification service 170. The media item may be provided to server computing device 150 as a single file or multiple files (e.g., as a portion of a larger file). Alternatively, one or more digital fingerprints of the media item may be generated and provided to identification service 170. In one embodiment, a computing device 101 divides a media item into multiple segments, and one or more segments (or a digital fingerprint of one or more segments) are sent to server computing device 150. Alternatively, a digital fingerprint of the media item may be determined from the whole of the media item and transmitted to the server computing device 150.

In one embodiment, computing device 101 hosts a media content sharing platform 175A and may include storage for storing an Operating System (OS), programs, and/or specialized applications to be run on the computing device. Computing device 101 may further include storage for storing media items of the media content sharing platform 175. The media items may also be stored remote to computing device 101 and retrieved from the remote storage.

In one embodiment, identification service 170 includes a media identifier 160, resource allocation logic 162 and compliance logic 171. In one embodiment, identification service 170 additionally includes a media classifier 180. Media identifier 160 analyzes received media items (or digital fingerprints associated with media items) to identify known works in the media items. Media identifier 160 may identify one or more works, one or more portions of works, and/or lengths of each of the one or more works (or portions of works). Based on the identified lengths, resource allocation logic 162 may determine how to allocate resources to rights holders of the identified works. Media identifier 160 may generate values for each identified work in a media item and a value based on a total length of the media item. The respective values may simply be the identified lengths or may be directly or indirectly based on the respective lengths. For example, the values may be normalized values based on the lengths. Based on the determined values, compliance logic 171 may determine one or more compliance actions. Additionally, or alternatively, based on the identified lengths and/or values, compliance logic 171 may determine one or more compliance actions to perform. Such compliance actions may include removal of the media item from the media content sharing platform 175, removal of a portion of the media item that contains a particular work from the media content sharing platform, or leaving the media item unchanged on the media content sharing platform 175.

The media identifier 160 may communicate with storage 145 that stores known works 147 and/or digital fingerprints of known works. Storage 145 may be a local storage unit or a remote storage unit. The storage 145 can include magnetic storage units, optical storage units, solid state storage units, storage servers, and/or similar storage units. The storage 145 can be monolithic devices or a distributed set of devices. A 'set,' as used herein, refers to any positive whole number of items including one. In some embodiments, the storage 145 may be a storage area network (SAN) or network attached storage (NAS) device. The known works 147 may be media items that have a known classification and/or a known identification. Additionally, one or more digital fingerprints of the known works 147 may be stored in storage 145. Licensing information and/or ownership information about the known works 147 may also be stored.

In one embodiment, identification service 170 includes a media classifier 180, which may classify media items before the media items are identified. Classification of a media item may utilize much fewer resources (e.g., compute resources) than identification of the media item. Accordingly, classification of the media item may be performed prior to identification to determine whether identification is warranted and/or to identify specific portions of the media items for which identification is warranted. In many instances identification of some or all of a media item may not be warranted, in which case the resources that would have been used to identify the media item may be conserved. Media content items may also be classified for other purposes, such as to determine licensing rates. In one embodiment, media classifier 180 classifies media items as containing music or not containing music. In one embodiment, media classifier 180 classifies each portion of a media item as containing music or not containing music. For example, media classifier 180 may identify seconds 0-20 of a media item as containing music and may identify seconds 20-100 of the media item as not containing music. Seconds 0-20 of the media item may then be processed by media identifier 160 to identify the music in seconds 0-20.

In one embodiment, media classifier 180 is located on computing device 101 in addition to or instead of being included in identification service 170. In such an embodiment, media classifier 180 may classify media items or portions of media items prior to those media items being sent to the server computing device 150 for identification. Those portions of the media item having a particular classification (e.g., containing music) may be sent to server computing device 150 for identification, while those portions of the media item not having the particular classification (e.g., not containing music) may not be sent to the server computing device 150. This may reduce network bandwidth usage, memory usage, processor usage and/or other resource utilization.

Figure 2:
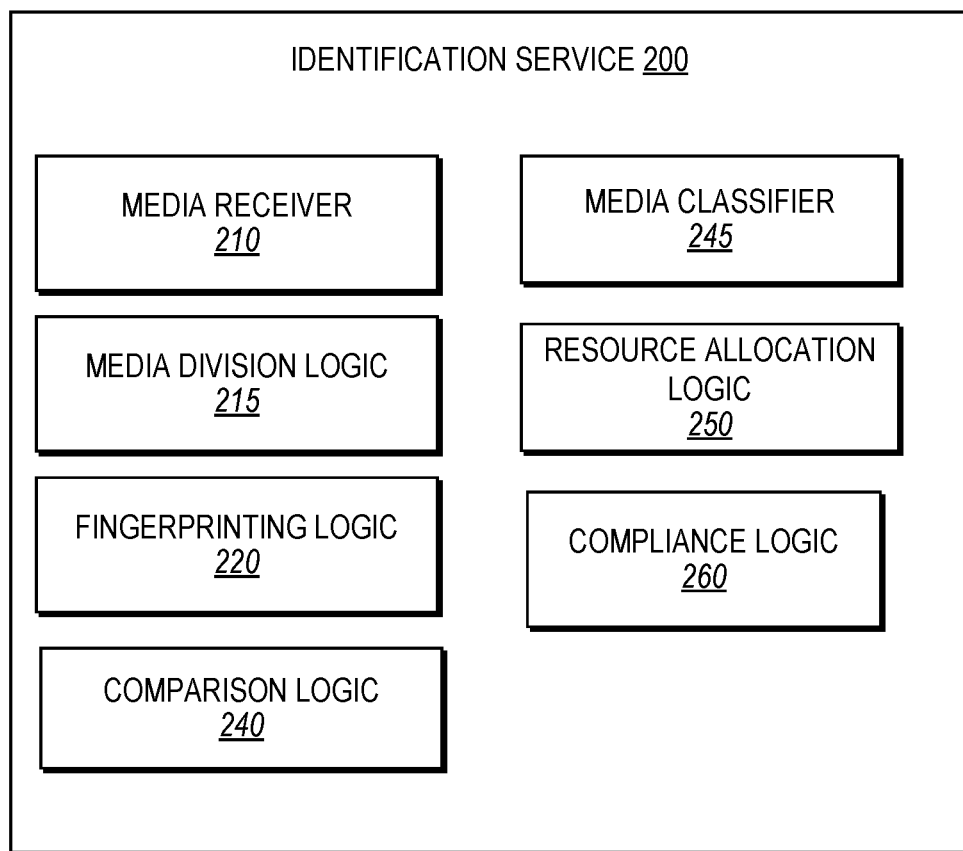
FIG. 2 is a block diagram illustrating an identification service, according to an embodiment.

FIG. 2 is an example identification service 200 in accordance with some implementations of the disclosure. In one embodiment, identification service 200 corresponds to identification service 170 of FIG. 1. In one embodiment, the identification service 200 includes a media receiver 210, a media division logic 215, fingerprinting logic 220, comparison logic 240, media classifier 245, resource allocation logic 250 and compliance logic 260. Alternatively, one or more of the logics and/or modules of the identification service 200 may be distinct modules or logics that are not components of identification service 200. For example, resource allocation logic 250, compliance logic 260 and/or media classifier 245 may be distinct from identification service 200. Additionally, or alternatively, one or more of the modules or logics may be divided into further modules or logics and/or combined into fewer modules and/or logics.

The media receiver 210 may receive data associated with media items to be identified. The data may be received from a remote computing device (e.g., a media content sharing platform running on a remote computing device). Received data may be an entire media item (e.g., an entire file), one or more segments of a media item, a set of features of a media item, a set of features of a segment of a media item, a digital fingerprint of the entire media item, and/or digital fingerprints of one or more segments of the media item. The received data may be provided to any of the other processing blocks such as the media division logic 215, the fingerprinting logic 220, the comparison logic 240, the media classifier 245, etc.

In one embodiment, a received media item or portion of the media item may be provided to the media division logic 215 for segmentation into a plurality of segments. The plurality of segments may be of equal or differing size based on length of time, file size, or any other characteristics. Additional characteristics may include video events identifying a scene transition (e.g., a fade to black), a measurable change of any spectral characteristics, or other features of the media item. Additional characteristics may additionally or alternatively include audio events such as a crescendo, a period of silence, other measurable events, or other features of the media item. A segment of a media item may be less than an entirety of the media item and may include at least one of audio or video media content. In one embodiment, a segment is a clip (e.g., a sequence of frames) of the media item. For example, a segment may be between a 1 second clip and a 10 second clip of a video or song.

Fingerprinting logic 220 may be invoked to generate digital fingerprints of one or more segments of a received media item. Alternatively, digital fingerprints of the one or more segments may have already been received. In one embodiment, a digital fingerprint for a large segment of the media item or for the entire media item may be subdivided into smaller digital fingerprints based on time stamps. For example, a digital fingerprint may include feature vectors associated with periodic intervals in the media item (e.g., associated with each second or each fraction of a second in the media item). A digital fingerprint for a larger time period may be divided into digital fingerprints for smaller time periods within that larger time period.

Fingerprinting logic 220 may create the digital fingerprint(s) using conventional digital signal processing known in the art. For example, a digital fingerprint of a sound stream may be generated according to acoustic and/or perceptual features over time. In one embodiment, digital fingerprints are generated by generating a feature vector of a segment of the work. The feature vector may be generated from an audio portion of the work, an image portion of the work, or both. For example, in one embodiment, fingerprinting logic 220 measures a variety of acoustical features of a segment. The acoustical features may include loudness, pitch, bass, brightness, bandwidth, Mel-frequency cepstral coefficients (MFCCs), and so forth. Fingerprinting logic 220 may also compute first and/or second derivatives of some or all of these features to determine changes in the features and rates of changes in the features. Fingerprinting logic 220 may compute statistical measurements such as mean and standard deviations of each of these features over the segment as well. Some or all of these values may be included in the feature vector.

Once the digital fingerprints have been generated, comparison logic 240 compares those digital fingerprints to digital fingerprints of known works. In one embodiment, each digital fingerprint is for a segment of the media item that overlaps with other segments of the media item. For example, a first digital fingerprint may be for a segment of seconds 1-6, a second digital fingerprint may be for a segment of seconds 2-6, and so on. Comparison logic compares the digital fingerprints of the media item to digital fingerprints of one or more known works until a match is found or until a comparison has been made to all of the digital fingerprints of all of the known works stored in a data store accessible to identification service 200. As noted, a media item may be cut into a series of overlapping segments. Each segment may be the exact size of a reference sample of a known work that the segment of the media item is to be compared to in an embodiment. The comparison logic will then compare the digital fingerprints of the media item to every possible digital fingerprint of a known work until a match if found. This process repeats for each known work until a match is found. Each known work that is compared to the media item may be a registered work that has been registered with the identification service 200. A match may be identified for a smallest distance between a digital fingerprint of the media item to a digital fingerprint of a known work. If the distance is below a predefined threshold, a match is considered to be found in one embodiment.

Comparison logic 240 may perform the above noted comparison for multiple different segments of the media item. A single media item may include all or portions of multiple different works. Accordingly, different segments of the media item may be identified as being portions of different works. An output of the comparison logic 240 may be an indication of each of the works that is represented in the media item as well as the lengths of each of these works in the media item and/or the time offsets in the media item associated with the identified works. For example, 15 seconds of a first work may be identified and 30 seconds of a second work may be identified in a media item.

Embodiments have been discussed with reference to comparison of digital fingerprints for identification of works in media items. However, it should be understood that digital fingerprints may be omitted, and segments of the media item may be compared to segments of known works without use of digital fingerprints. Digital fingerprints reduce the amount of data that is transmitted and compared. However, in systems with very high bandwidth and/or large amounts of processor resources, segments may be compared directly without use of digital fingerprints.

In one embodiment, media classifier 245 classifies segments of a media item before those segments are identified (e.g., before those segments are fingerprinted and/or before digital fingerprints of those segments are compared to digital fingerprints of known works for identification). To perform classification, media classifier 245 may determine features of one or more segments of the media item. A segment of the media item may be analyzed with respect to a set of features including loudness, pitch, brightness, spectral bandwidth, energy in one or more spectral bands, spectral steadiness, Mel-frequency cepstral coefficients (MFCCs), and so on. Media classifier 245 may determine values for some or all of these features, and may generate a feature vector for the segment that includes the determined feature values. In one embodiment, media classifier 245 uses a digital fingerprint output by fingerprinting logic 220 to perform classification. Alternatively, media classifier 245 generates a distinct feature vector that may have different features and/or values than a digital fingerprint generated from the same segment of a media item.

Media classifier 245 may include one or more machine learning profiles and/or machine learning models (i.e., profiles and models produced using machine learning techniques) that are used to perform classification of segments of media items. The machine learning profiles may be generated applying machine learning techniques to a collection of media items with known classifications. The media items may be provided as an input to a machine learning profiler as part of a training data set to generate the profiles and/or models. The machine learning profiler may perform supervised machine learning to identify a set of features that are indicative of a first classification and another set of features that are indicative of another classification. The first set of features indicative of the first classification (e.g., indicative of music) may be defined in a first model and a second set of features indicative of the second classification (e.g., lack of music) may be defined in a second model. Alternatively, profiles may be generated for more than two classifications.

Machine learning models/profiles may be generated for identifying one or more classes of media items. For example, a machine learning profile may be generated for identifying, for media items having audio, whether the audio comprises music or does not comprise music. The machine learning profile may be used for classifying media items received over the network 131 from the computing device 101. Audio media items may be classified, for example, into a music classification or a non-music classification. Classification may be performed on a received media item, a received portion or segment of a media item, or a digital fingerprint of a media item or a portion or segment of the media item. In one embodiment, only segments of media items having specific classifications are processed by a comparison logic 240 for identification. For example, segments of media items that are classified as containing music may be processed by comparison logic 240 for identification.

In some instances, comparison logic 240 may determine that resource allocation logic 250 is to be invoked. Resource allocation logic 250 may be invoked to determine how to allocate royalties and/or other resources to one or more rights holders. In one embodiment, resource allocation logic 250 determines a licensing rate to apply to a media item based on a percentage of the media item that has a particular classification (e.g., that contains music). The licensing rate may be a static rate, a tiered rate, or may be dynamically calculated according to the prevalence of the known work in the media item. In one embodiment, a media item is segmented into a plurality of segments. Each segment may be individually classified. Then a percentage of the segments having one or more classifications may be determined. Additionally, licensing logic 250 may determine a ratio of segments having a particular classification to segments having other classifications. For example, licensing logic may determine a ratio of a media item that contains music. Based on the ratio and/or percentage of a media item that has a particular classification, licensing logic 250 may determine a licensing rate. A first licensing rate may be determined if the ratio and/or percentage is below a threshold, and a second higher licensing rate may be determined if the ratio and/or percentage is equal to or above the threshold.

In one embodiment, resource allocation logic 250 determines how to allocate or divide royalties between multiple different rights holders. Comparison logic 240 provides to resource allocation logic 250 an indication of each known work included in a media item and the lengths of each work in the media item. Comparison logic 240 may also provide a length of the media item. Resource allocation logic 250 may then determine resource allocation based on the relative lengths of the different works to each other and/or the cumulative lengths of the different works relative to the total length of the media item. For example, resource allocation logic 250 may determine that 50% of a media item is a first work and 50% of the media item is a second work. In such an instance, resource allocation logic 250 may determine that royalties for the media item should be split equally between a rights holder of the first work and a rights holder of the second work. In another example, resource allocation logic 250 may determine that 25% of a media item is a first work and 75% of the media item is a second work. In such an instance, resource allocation logic 250 may determine that 25% of royalties should be provided to a first rights holder of the first work and 75% of the royalties should be provided to a second rights holder of the second work. In one embodiment, the overall licensing rate is determined based on the percentage of a media item that contains music, and then how to apportion the licensing rate among rights holders is determined based on the relative lengths of each of the identified works in the media item.

Resource allocation logic 250 may additionally determine a total length of each of the works that are included in the media item. For example, a media item may include 1 minute of a first work and 1 minute of a second work. The first work may have a length of 1 minute and the second work may have a length of 10 minutes in an example. In some embodiments, resource allocation logic 250 determines the fraction of a work that is included in a media item and uses this data to determine how to divide royalty payments. In the previous example, even though the portion of the media item that includes the first work and the portion of the media item that includes the second work have the same length, royalties may be proportioned unevenly between the first and second rights holders. The percentage of the royalties that are paid to the second work may be reduced because only 10% of the second work is included in the media item while 100% of the first work is included in the media item, for example.

In some embodiments, compliance logic 260 determines whether to perform any compliance actions based on the output of comparison logic 240. Some works may be registered with identification service 200 for monetization. When such works are identified, compliance logic 260 may invoke resource allocation logic 250 to determine how to allocate resources to a rights holder of the registered work. Some works may be registered with identification service for take-down. When such works are identified, compliance logic 260 may determine that the media items containing such works (or portions of such works) should be removed from a media content sharing platform.

Once a determination for content removal and/or resource distribution is determined, identification service 170 may report such a determination to the media content sharing platform. For example, identification service 170 may notify the media content sharing platform 175 that a media item should be removed or that a portion of a media item should be removed. Alternatively, or additionally, resource allocation logic 250 may allocate resources and apply those resources to appropriate accounts of rights holders that have registered with the identification service 200.

FIGS. 3A-5 are flow diagrams illustrating various methods of allocating resources for media items and/or performing compliance operations with regards to media items based on known works included in those media items. In particular, the methods depicted in the flow diagrams are methods of computing temporal fractions of works within a media item and using such temporal fractions. The methods may be performed by processing logic that comprises hardware (e.g., circuitry, dedicated logic, programmable logic, microcode, etc.), software (e.g., instructions run on a processor), firmware, or a combination thereof. The methods may be performed, for example by one or more of computing devices 101 and/or server computing device 150 of FIG. 1 in embodiments. The methods may also be performed by identification service 200 of FIG. 2 in embodiments.

Figure 3A:
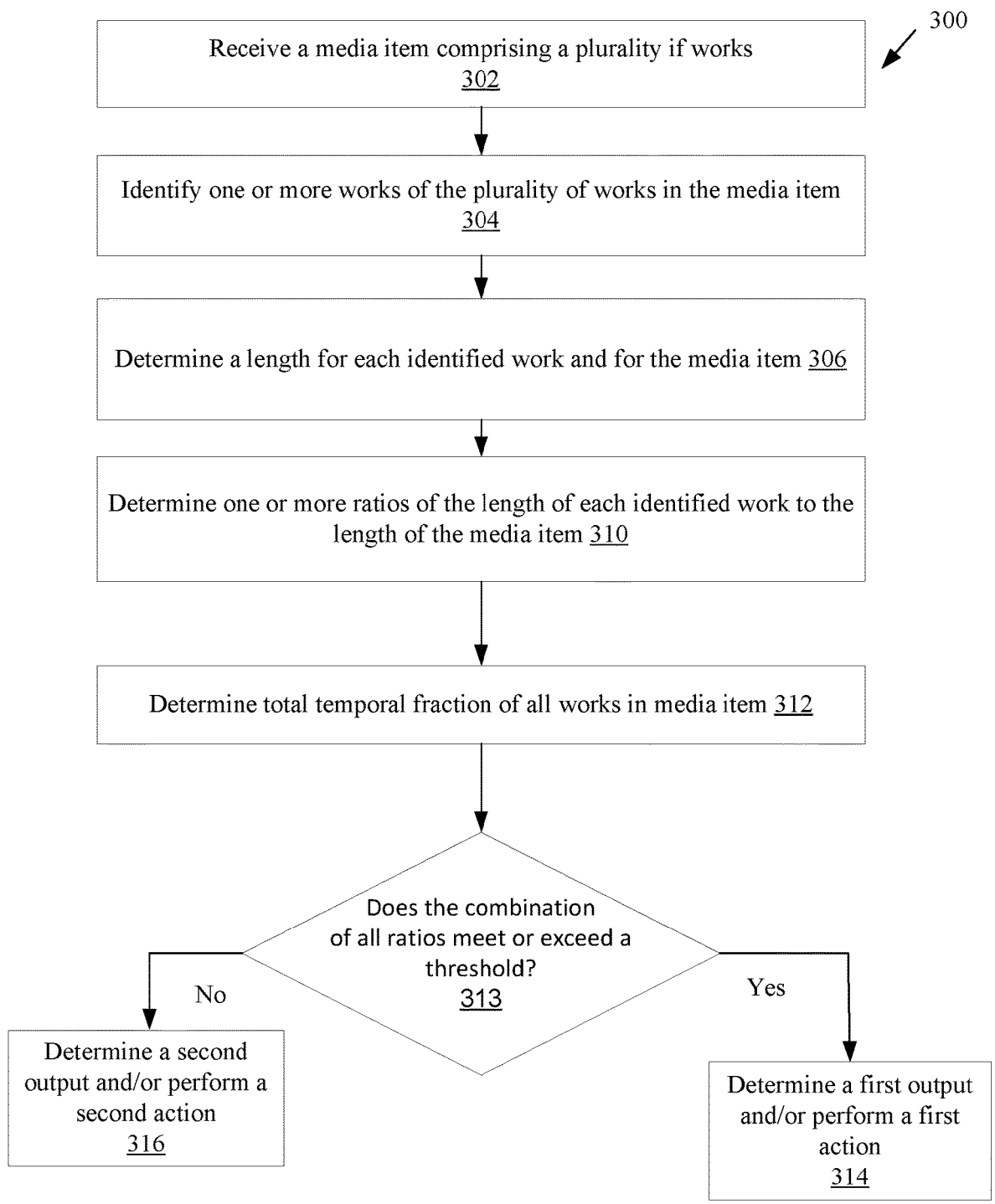
FIG. 3A is a flow diagram illustrating a method for identifying works within media items and determining output based on length of work, according to an embodiment.

FIG. 3A is a flow diagram illustrating a method 300 for identifying works within media items and determining output based on length of work, according to an embodiment. At block 302 of method 300, processing logic receives a media item comprising a plurality of works. The media item may be a media clip from a file, a portion of a file, a stream, a download, or another format. The media item may be a media clip of audio data and/or a media clip of video data. In one embodiment, the media item is provided by a media content sharing platform. In one embodiment, a digital fingerprint (or multiple digital fingerprints) of the media item is received rather than, or in addition to, the media item itself. The digital fingerprint(s) may indicate a total length of the media item and may include feature vectors associated with different time offsets in the media item.

At block 304, media identification is performed on the media item to identify one or more works (reference content) included in the media item. The media identification may be performed as described above with reference to comparison logic 240 and/or as described below with reference to FIG. 4. At block 306, processing logic determines a length of each identified work and a total length of the media item based on the media identification. A result of the media identification may be an indication of which registered works are included in the media item, the length of each work in the media item, and/or values based on the lengths of the works. The media item may also include all or portions of one or more additional works that have not been registered with the identification service (e.g., that are not copyright protected). Such works are not identified. For example, processing logic may determine the starting time offset and ending time offset for each work included in the media item. Note that some media items may include portions of a particular work spread across multiple non-contiguous portions of the media item. In such an embodiment, processing logic may determine the start and end time offsets associated with each such portion as well as the total time that is a sum of the lengths of each such portion.

At block 310, processing logic determines, for each identified work, a ratio of the length of the work to the total length of the media item. Alternatively, processing logic may determine ratios of values based on such lengths. For example, processing logic may divide the length of a work by the total length of the media item to determine the ratio for that work in the media item. The ratio of the length of the work to the length of the media item is referred to herein as the temporal fraction of the work in the media item. At block 312, processing logic determines a total temporal fraction of all works in the media item. This may be computed by adding the temporal fractions of each work in the media item (adding the ratios together).

At block 313, processing logic determines whether the combination of all of the ratios meets or exceeds a threshold (determines of the total temporal fraction meets or exceeds the threshold). The threshold may be any value between 1% and 99%. Some examples of thresholds include 5%, 10%, 15%, 20%, 25% and 50%. If the combination of all ratios fails to meet or exceed the threshold, the method continues to block 316. If the combination of all ratios meets or exceeds the threshold, the method continues to block 314

At block 314, processing logic determines a first output and/or performs a first action. For example, processing logic may determine a first royalty rate to apply to the media item. In another example, processing logic may determine that the media item should be removed from a media content sharing platform.

At block 316, processing logic determines a second output and/or performs a second action. For example, processing logic may determine a second royalty rate to the media item. The second royalty rate may be lower than the first royalty rate in embodiments. In another example, processing logic may determine that the media item should not be removed from a media content sharing platform.

Figure 3B:
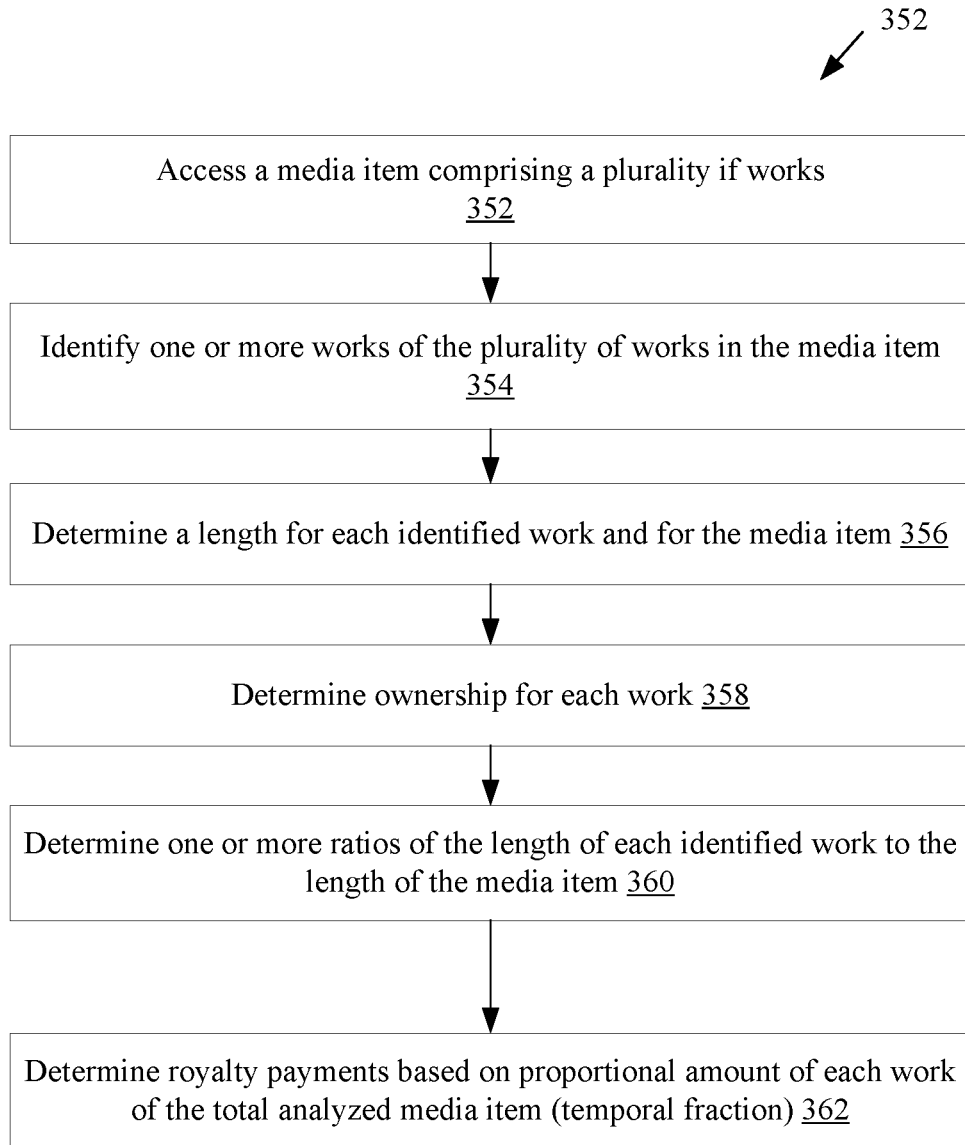
FIG. 3B is a flow diagram illustrating an embodiment of a method for determining resource allocation based on temporal fractions of multiple works within a media item.

FIG. 3B is a flow diagram illustrating an embodiment of a method 352 for determining resource allocation based on temporal fractions of multiple works within a media item. At block 353, processing logic accesses a media item comprising a plurality of works. The media item may be received and/or a digital fingerprint of the media item may be received, for example. The media item may be a file, stream, broadcast, download, or other format of media item, as discussed above. Additionally, the media item may contain video data and/or audio data, as also discussed above.

At block 354, media identification is performed on the media item to identify one or more works (reference content) included in the media item. The media identification may be performed as described above with reference to comparison logic 240 and/or as described below with reference to FIG. 4. At block 356, processing logic determines a length of each identified work and a total length of the media item based on the media identification, and/or values based on such lengths. A result of the media identification may be an indication of which registered works are included in the media item and the length of each work in the media item. The media item may also include all or portions of one or more additional works that have not been registered with the identification service (e.g., that are not copyright protected). Such works are not identified. For example, processing logic may determine the starting time offset and ending time offset for each work included in the media item. Note that some media items may include portions of a particular work spread across multiple non-contiguous portions of the media item. In such an embodiment, processing logic may determine the start and end time offsets associated with each such portion as well as the total time that is a sum of the lengths of each such portion.

At block 358, processing logic determines ownership for each registered work that was identified. Each registered work may be associated with one or more rights holders that own rights to the work. Accordingly, the owners/rights holders may be determined based on performing a lookup in a data store (e.g., a relational database) using an identifier (ID) of the work as a key.

At block 360, processing logic determines, for each identified work, a ratio of the length of the work to the total length of the media item (a temporal fraction for that work). At block 362, processing logic determines royalty payments based on a proportional amount of each work of the total analyzed media item (based on the temporal fractions or ratios). The royalty payments may be determined directly from the ratios/temporal fractions or indirectly from the ratios/temporal fractions. In an example, a media item may be 180 seconds long. In the example media item, it is determined using content identification techniques that there are song clips of two works, one being 30 seconds long and the other being 72 seconds long. The temporal fraction for the first work is 16.7% and the temporal fraction for the second work is 40%. These percentages may be applied to split the royalties between the rights holders.

In one embodiment, the temporal fractions are normalized so that a combination of the temporal fractions for all identified works equals 100%. The royalty rates may then be determined based on the normalized temporal fractions. For example, 40%+16.7%=56.7%, and 40/56.7+16.7/56.7=100%. Accordingly, the normalized temporal fractions in this example are 70.5% and 29.5%, respectively. Thus, 70.5% of a royalty payment may be made to a first rights holder for the second rights holder and 29.5% of the royalty payment may be made to a second rights holder in this example.

The royalty payments may be fractional amounts of a total royalty payment to be made. The royalty payment may be based on advertising revenue that is generated by the media item. The total royalty payment may be negotiated between rights holders, the identification service, the media content sharing platform and/or third parties in embodiments. In one embodiment, the total royalty payment (also referred to as overall licensing rate) is determined at least in part on the percentage of the media item that contains music, as discussed above. In an example, if $2 of advertising revenue is generated from the media item, that advertising revenue may be split between a framework provider (e.g., media content sharing platform and/or identification service) and rights holders. In an example, 50% of the revenue goes towards royalty payments and 50% of the revenue is retained by the framework provider. Further extending the above example having the normalized temporal fractions of 70.5% and 29.5%, of the 50% ($1) that is provided to the rights holders as royalties 70 cents is provided to the second rights holder and 30 cents is provided to the first rights holder.

In one embodiment, royalty payments are weighted based on a combination of 1) the percentage of the duration of an included portion of a work to the duration of a media item and 2) the percentage of the included portion of the work to the duration of the original work. The smaller the percentage of the included portion of the work to the duration of the original work, the lower the weight applied to a royalty payment for a rights holder. Continuing the above example having the normalized temporal fractions of 70.5% and 29.5%, assume that the first work has a duration of 30 seconds and the second work has a duration of 144 seconds. Accordingly, the portion of the first work in the media item is 100% of the first work and the portion of the second work in the media item is 50% of the second work. These two portion sizes may be normalized to a combined 100%, such that the first work is normalized to 77% (100%/150%) and the second work is normalized to 33% (e.g., 50%/150%). Accordingly, the royalties may be adjusted to (0.777+0.295=1.072) and (0.333+0.705=1.038), which may be normalized then to approximately 50% royalties to the first rights holder and 50% royalties to the second rights holder.

In some embodiments, the weighting of the percentage of the duration of an included portion of a work to the duration of the media item is different than the weighting of the percentage of the included portion of the work to the duration of the original work. For example, the weighting of the percentage of the duration of an included portion of a work to the duration of the media item may be higher (e.g., 2 times higher) than the weighting of the percentage of the included portion of the work to the duration of the original work. In another example, the normalized temporal fractions of the portion of the works to the duration of the media item are 70.5% and 29.5%, respectively, and the normalized percentages of the included portions of the works to the durations of the original works are 33% and 77%, respectively. If the weight applied to the temporal fractions of the portion of the works to the duration of the media item are weighted two times greater than the normalized percentages of the included portions of the works to the durations of the original works, then the division of the royalty payments would be to (0.777+0.295*2=1.367) and (0.333+0.705*2=1.743), which when normalized amounts to (1.367/3.11=44%) and (1.743/3.11=56%), respectively.

Figure 3C:
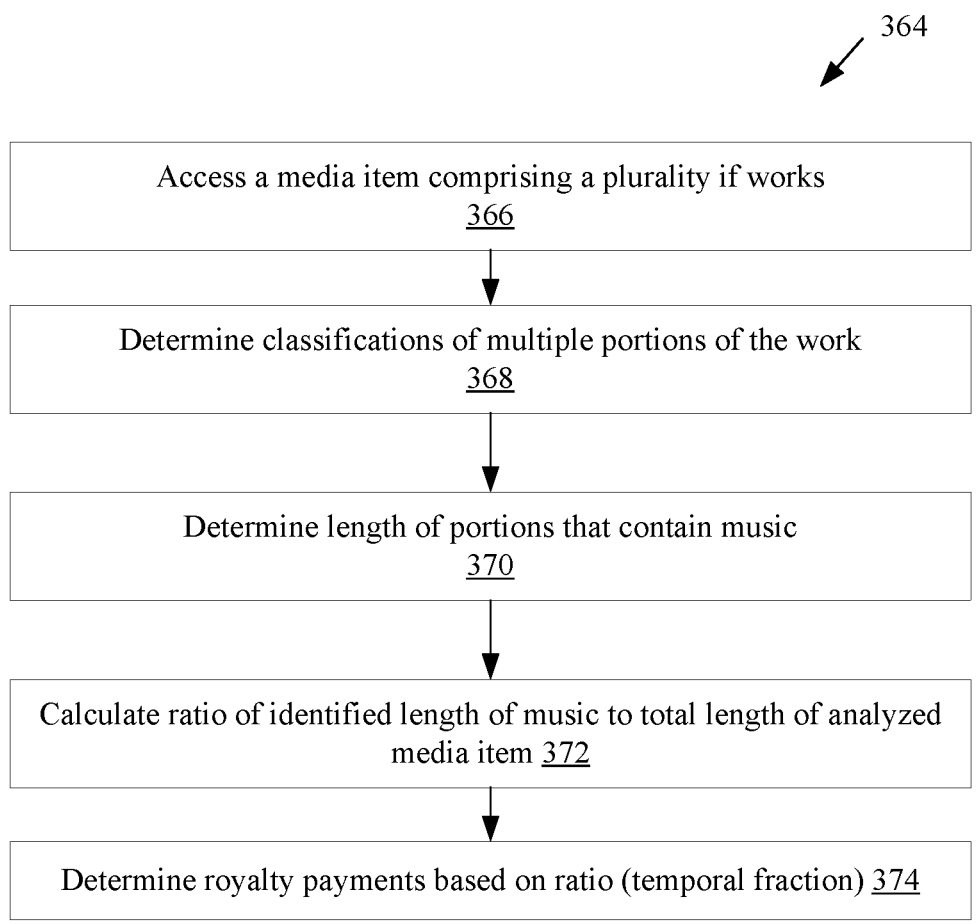
FIG. 3C is a flow diagram illustrating an embodiment of a method for determining resource allocation based on a temporal fraction of registered music within a media item.

FIG. 3C is a flow diagram illustrating an embodiment of a method 364 for determining resource allocation based on a temporal fraction of registered music within a media item. At block 366 of method 364, processing logic accesses a media item comprising a plurality of works. The media item may be received and/or a digital fingerprint of the media item may be received, for example. The media item may be a file, stream, broadcast, download, or other format of media item, as discussed above. Additionally, the media item may contain video data and/or audio data, as also discussed above.

The media item may be received from additional processing logic hosted by a same computing device as the processing logic executing the method. Alternatively, the media item may be received from a remote computing device. In one embodiment, the media item is a live stream, and the live stream is periodically analyzed. For example, a segment of the live stream may be analyzed every few minutes. Alternatively, the media item may be a media item (e.g., a file) that is stored in a storage. For example, the media item may be received at a client side processing logic implementing one or more operations of method 364.

At block 368, processing logic divides the media item into portions or segments and classifies each portion or segment of the media item. Classification may be performed using a machine learning profile that can classify a portion of a media item (e.g., a 6 second clip of the media item, a 10 second clip of the media item, a 1 minute clip of the media item, etc.) as either containing music or not containing music.

To classify portions of a media item, a set of features (e.g., a feature vector) of the media item may be determined for each portion. In one embodiment, the set of features that are extracted are the set of features which optimally determine the likelihood that a media item belongs to a classification. For example, the features that are extracted from the media item may include the loudness envelope of the audio component of the media item to determine the loudness at each moment in time. Features representative of the brightness of the audio (e.g., bass and treble component of the audio) may also be extracted. A derivative of the loudness envelope may be taken to identify the change in the loudness at each time. An FFT algorithm identifying other characteristics and an MFCC algorithm may be applied to identify the frequency domain characteristics and the clustered features of the media item. Features may be extracted at an interval (e.g., 1 second interval, 0.5 second interval, 0.10 second interval). In another example, fifty two features may be extracted at multiple time intervals and used to generate a feature vector. Alternatively, more or fewer features may be extracted and used to generate a feature vector.

The set of features may be analyzed using machine learning profiles for a first and second class of media items. In one embodiment, a single machine learning profile (also referred to herein as a media classification profile or media alteration profile) contains models for multiple different classifications of media items. Alternatively, a separate machine learning profile may be used for each model. In one embodiment, the machine learning profiles comprise a machine learning model and other associated metadata. The extracted features of the media item are supplied to the machine learning model(s) (e.g., as a feature vector) and an output may be generated indicating the likelihood that the media item matches the classification of the machine learning profile. For example, a media classification profile may identify a first percentage chance that a media item comprises audio features representative of music and a second percentage chance that the media item comprises audio features representative of a lack of music. In one embodiment, the percentage chance (or probability or likelihood) that the media item belongs to a particular classification is compared to a threshold. If the percentage chance that the media item belongs to a particular class exceeds the threshold (e.g., which may be referred to as a probability threshold), then the media item may be classified as belonging to the particular class.

At block 370, processing logic determines a combined length of the portions of the media item that contain music. At block 372, processing logic calculates a ratio of the identified length of music to a total length of the analyzed media item (also referred to as the temporal fraction of music in the media item). At block 374, processing logic determines royalty payments based on the determined ratio/temporal fraction. For example, if 10% of the media item contains music then a first royalty rate may be applied, if 50% of the media item contains music then a higher second royalty rate may be applied, and if 80% of the media item contains music then a still higher third royalty rate may be applied. In one embodiment, the ratio/temporal fraction is compared to one or more thresholds. A lower royalty rate may be applied if the ratio fails to meet a threshold and a higher royalty rate may be applied if the ratio meets or exceeds a threshold.

Figure 3D:
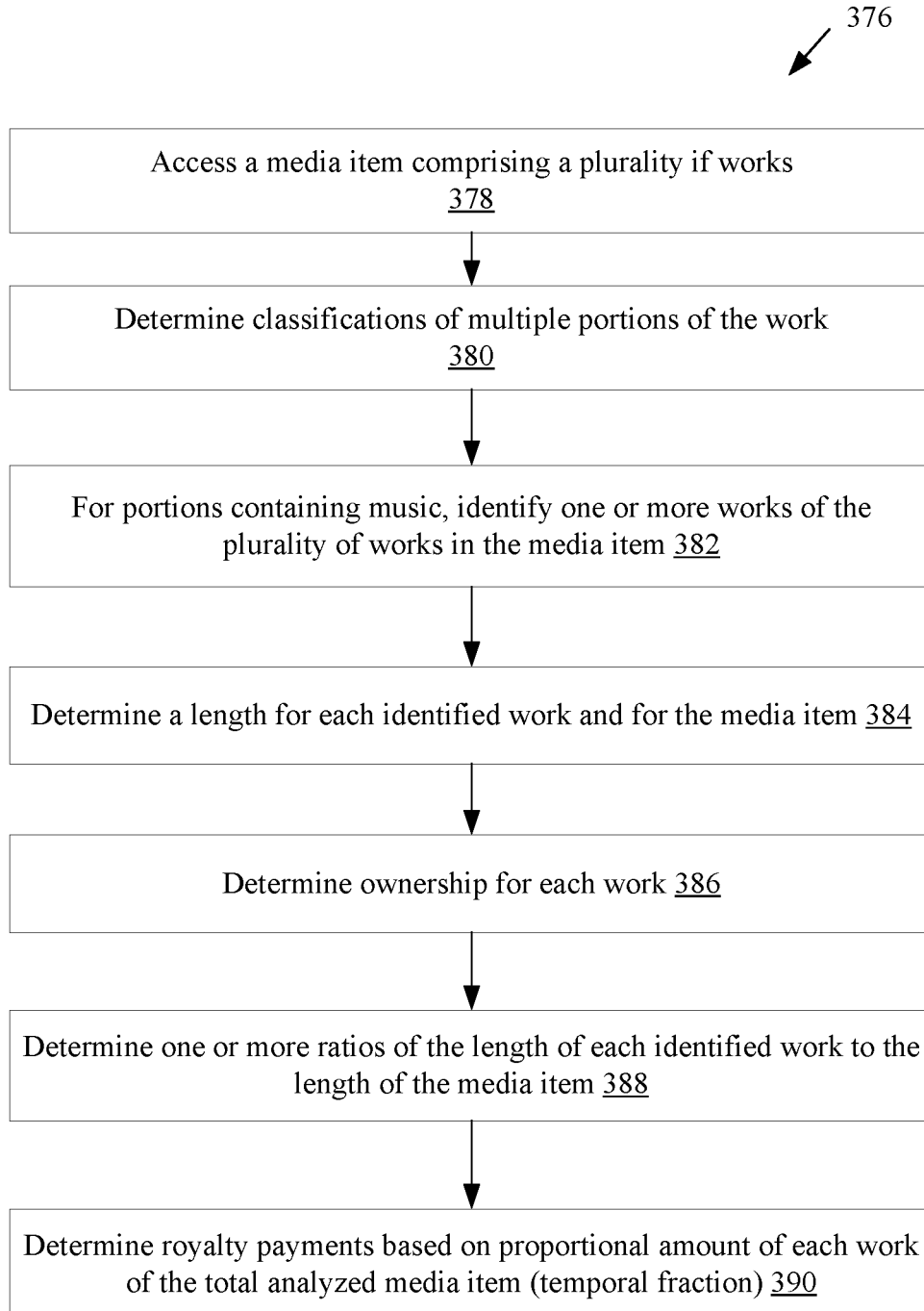
FIG. 3D is a flow diagram illustrating an embodiment of a method for determining resource allocation based on a temporal fraction of registered music within a media item.

FIG. 3D is a flow diagram illustrating an embodiment of a method 376 for determining resource allocation based on a temporal fraction of registered music within a media item. At block 378 of method 376, processing logic accesses a media item comprising a plurality of works. The media item may be received and/or a digital fingerprint of the media item may be received, for example. The media item may be a file, stream, broadcast, download, or other format of media item, as discussed above. Additionally, the media item may contain video data and/or audio data, as also discussed above.

The media item may be received from additional processing logic hosted by a same computing device as the processing logic executing the method. Alternatively, the media item may be received from a remote computing device. In one embodiment, the media item is a live stream, and the live stream is periodically analyzed. For example, a segment of the live stream may be analyzed every few minutes. Alternatively, the media item may be a media item (e.g., a file) that is stored in a storage. For example, the media item may be received at a client side processing logic implementing one or more operations of method 364.

At block 380, processing logic divides the media item into portions or segments and classifies each portion or segment of the media item. Classification may be performed using a machine learning profile that can classify a portion of a media item (e.g., a 6 second clip of the media item, a 10 second clip of the media item, a 1 minute clip of the media item, etc.) as either containing music or not containing music. Classification may be performed as discussed above with reference to FIG. 3C.

At block 382, processing logic performs identification operations to identify works in the portions that contain music. The identification may be performed as described above. However, in method 376 identification operations may not be performed for those portions of the media item that were classified as not containing music.

At block 384, processing logic determines a length of each identified work and a total length of the media item based on the media identification. A result of the media identification may be an indication of which registered works are included in the media item and the length of each work in the media item. The media item may also include all or portions of one or more additional works that have not been registered with the identification service (e.g., that are not copyright protected). Such works are not identified. For example, processing logic may determine the starting time offset and ending time offset for each work included in the media item. Note that some media items may include portions of a particular work spread across multiple non-contiguous portions of the media item. In such an embodiment, processing logic may determine the start and end time offsets associated with each such portion as well as the total time that is a sum of the lengths of each such portion.

At block 386, processing logic determines ownership for each registered work that was identified. Each registered work may be associated with one or more rights holders that own rights to the work. Accordingly, the owners/rights holders may be determined based on performing a lookup in a data store (e.g., a relational database) using an identifier (ID) of the work as a key.

At block 388, processing logic determines, for each identified work, a ratio of the length of the work to the total length of the media item (a temporal fraction for that work). At block 390, processing logic determines royalty payments based on a proportional amount of each work of the total analyzed media item (based on the temporal fraction or ratios). The royalty payments may be determined directly from the ratios/temporal fractions or indirectly from the ratios/temporal fractions.

Figure 4:
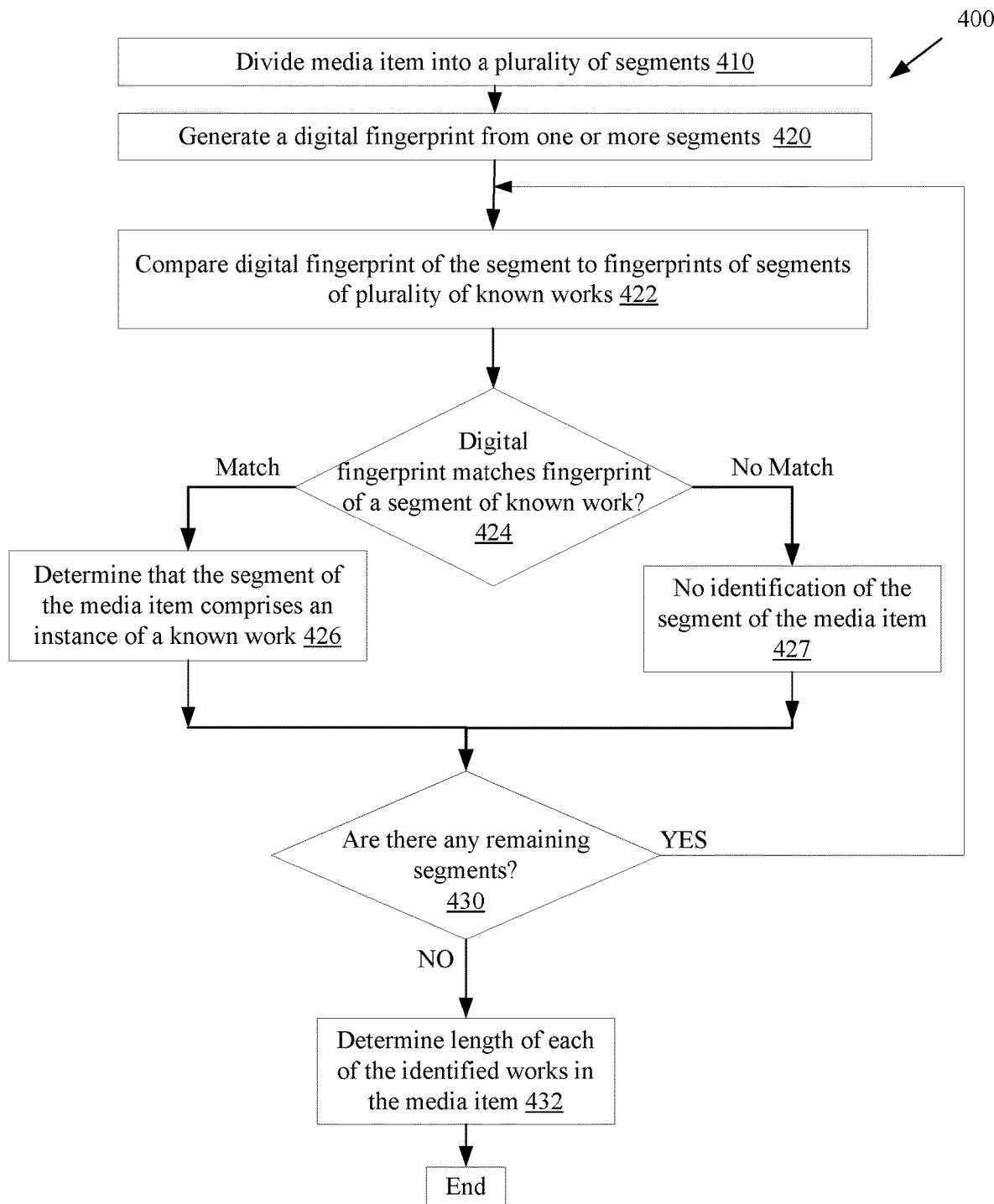
FIG. 4 is a flow diagram illustrating a method for identifying works within media items based on digital fingerprints and determining length of identified works according to an embodiment.

FIG. 4 is a flow diagram illustrating a method 400 for identifying works within media items based on digital fingerprints and determining length of identified works according to an embodiment. At block 410, a media item is divided into a plurality of segments. The segments may be overlapping or non-overlapping segments. For example, a first segment may be seconds 0-5 of a media item, a second segment may be seconds 1-6 of the media item, a third segment may be seconds 2-7 of the media item, and so on. At block 420, processing logic generates a digital fingerprint of each of the segments. Alternatively, at block 410 processing logic may begin with a large digital fingerprint of a media item and may divide the digital fingerprint into digital fingerprint segments. For example, a first digital fingerprint may be for seconds 0-5 of the media item, and so on. In such an embodiment the operations of block 420 may be omitted.

At block 422, processing logic compares a digital fingerprint of a segment to digital fingerprints of segments of a plurality of known works (reference samples). At block 424, processing logic determines whether a match is found between the digital fingerprint of the segment and a digital fingerprint of any registered work. If a match is found, the method continues to block 426 and a determination is made that the segment of the media item comprises an instance of a particular known work. If no match is found, then the method continues to block 427 and no identification is made for the segment. The method then proceeds to block 430, and processing logic determines whether there are any remaining segments from the media item that are to be compared. If so, the method returns to block 422 and a digital fingerprint for a next segment is compared to digital fingerprints of segments of known works. In one embodiment, if a match was found for a previous segment of the media item then the subsequent comparison of the next segment in the media item is first compared to a next segment of the work that follows the segment of the work that was matched to the previous segment of the media item. This may reduce a number of comparisons that are made to identify the next segment of the media item.

If at block 430 all segments of the media item have been processed, then the method continues to block 432. At block 432, processing logic determines a length of each of the identified works in the media item. This may be performed by summing the lengths of non-overlapping segments of the media item that matched segments of a particular work, for example.

Figure 5:
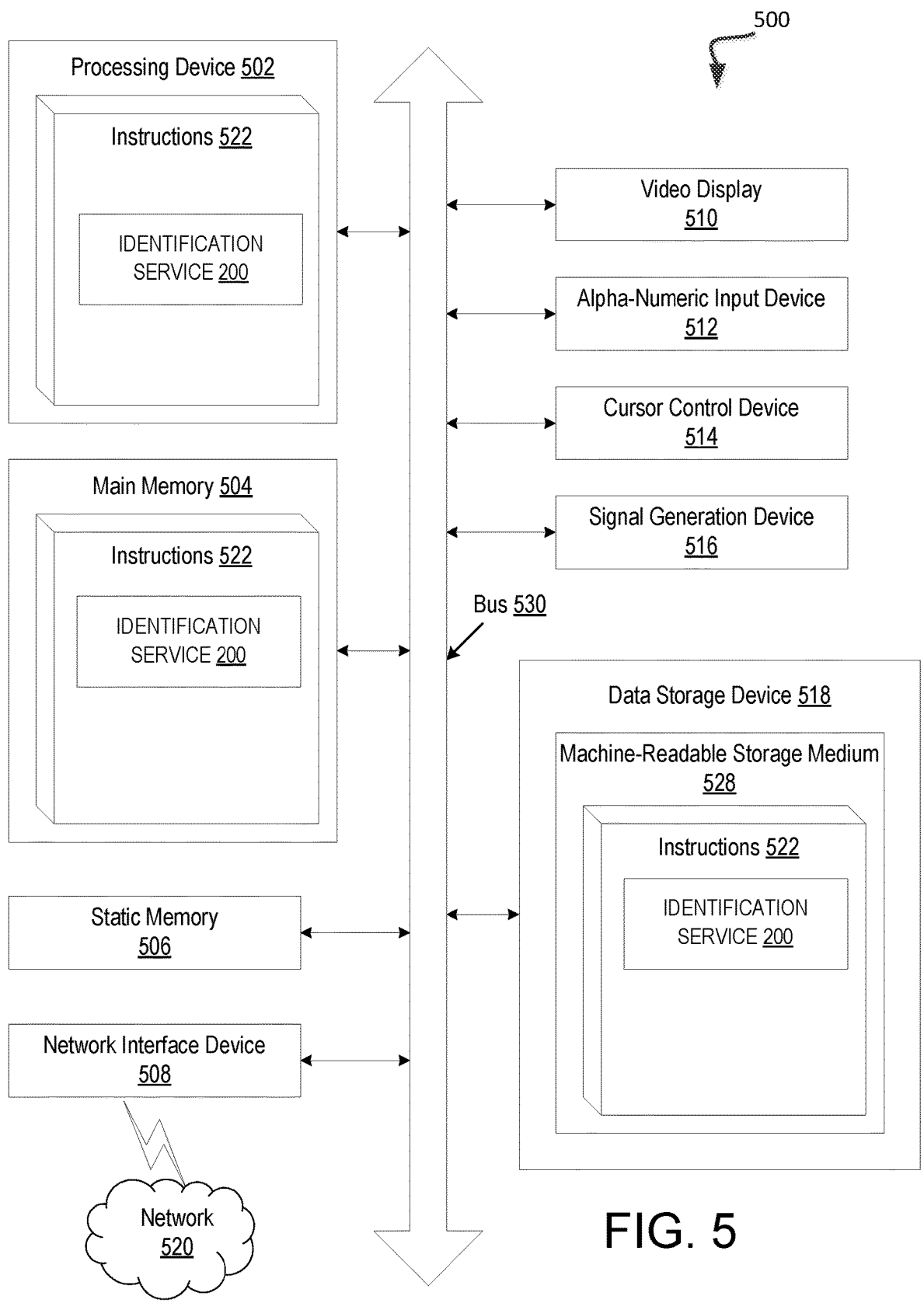
FIG. 5 is a block diagram illustrating an exemplary computer system, according to an embodiment.

FIG. 5 illustrates a diagrammatic representation of a machine in the exemplary form of a computing device 500 within which a set of instructions, for causing the machine to perform any one or more of the methodologies discussed herein, may be executed. The computing device 500 may be in the form of a computing device within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server computing device, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computing device 500 may represent computing device 101 or server computing device 150, as shown in FIG. 1.

The computing device 500 includes a processing device (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 518, which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute the media classifier 200 for performing the operations and steps discussed herein.

The computing device 500 may further include a network interface device 508. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable medium 528 on which is stored one or more sets of instructions 522 (e.g., instructions of identification service 200) embodying any one or more of the methodologies or functions described herein. The instructions 522 may also reside, completely or at least partially, within the main memory 504 and/or within processing logic 526 of the processing device 502 during execution thereof by the computer system 500, the main memory 504 and the processing device 502 also constituting computer-readable media.

While the computer-readable storage medium 528 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "receiving", "analyzing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. In addition, embodiments of the present invention are not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving a media item by a processor, wherein the media item comprises a plurality of works;
   identifying, by the processor, a first work of the plurality of works in the media item, wherein the first work is associated with a first media content owner, and wherein identifying the first work comprises:
   dividing the media item into a plurality of segments;
   generating, for one or more segments of the plurality of segments, a respective digital fingerprint from the segment;
   comparing each respective digital fingerprint to a plurality of stored digital fingerprints, wherein each of the plurality of stored digital fingerprints is associated with a respective known work;
   determining that one or more of the respective digital fingerprints match one or more stored digital fingerprints of the plurality of stored digital fingerprints; and
   determining a known work associated with the one or more stored digital fingerprints, wherein the first work corresponds to the known work;
   determining, by the processor, a first value based on a first length of the first work;
   determining, by the processor, a second value based on a second length of the media item;
   determining, by the processor, a third value based on a third length of the known work;
   determining, by the processor, a first ratio of the first value to the second value;
   determining, by the processor, a second ratio of the first value to the third value; and
   determining, by the processor, a first resource allocation to the first media content owner associated with the first work based at least in part on the first ratio, wherein the first resource allocation is weighted based on the first ratio and the second ratio.

2. The method of claim 1, further comprising:
identifying a second work of the plurality of works;
determining a fourth value based on a fourth length of the second work;
determining a third ratio of the fourth value to the second value; and
determining a second output based at least in part on the third ratio.

3. The method of claim 2, further comprising:
determining whether a combination of the first ratio and the third ratio meets or exceeds a threshold;
performing a first action responsive to determining that the combination meets or exceeds the threshold; and
performing a second action responsive to determining that the combination fails to meet or exceed the threshold.

4. The method of claim 1, further comprising:
determining a first portion of the media item that comprises music and a second portion of the media item that does not comprise music, wherein the respective digital fingerprints are generated for the first portion of the media item and not for the second portion of the media item.

5. The method of claim 4, wherein determining the first portion of the media item that comprises music comprises:
determining, for each segment of the plurality of segments, a set of features of the segment; and
analyzing the set of features of each segment using a media classification profile comprising a first model for a first class of media items comprising music and a second model for a second class of media items that do not comprise music.

6. The method of claim 1, further comprising:
determining whether the first ratio exceeds a threshold; and
removing the media item from a service responsive to the determination that the first ratio exceeds the threshold.

7. The method of claim 1, further comprising:
determining whether the first ratio exceeds a threshold;
determining the first resource allocation responsive to determining that the first ratio meets or exceeds the threshold; and
determining a second resource allocation responsive to determining that the first ratio fails to meet or exceed the threshold.

8. A computing device comprising a memory and a processor operatively coupled to the memory, the processor to:
receive a media item comprising a plurality of works;
identify a first work of the plurality of works in the media item, wherein the first work is associated with a first media content owner, and wherein to identify the first work, the processor is to:
divide the media item into a plurality of segments;
generate, for one or more segments of the plurality of segments, a respective digital fingerprint from the segment;
compare each respective digital fingerprint to a plurality of stored digital fingerprints, wherein each of the plurality of stored digital fingerprints is associated with a respective known work;
determine that one or more of the respective digital fingerprints match one or more stored digital fingerprints of the plurality of stored digital fingerprints; and
determine a known work associated with the one or more stored digital fingerprints, wherein the first work corresponds to the known work;
determine a first value based on a first length of the first work;
determine a second value based on a second length of the media item;
determine a third value based on a third length of the known work;
determine a first ratio of the first value to the second value;
determine a second ratio of the first value to the third value; and
determine a first resource allocation to the first media content owner associated with the first work based at least in part on the first ratio, wherein the first resource allocation is weighted based on the first ratio and the second ratio.

9. The computing device of claim 8, wherein the processor is further to:
identify a second work of the plurality of works;
determine a fourth value based on a fourth length of the second work;
determine a third ratio of the fourth value to the second value; and
determine a second output based at least in part on the third ratio.

10. The computing device of claim 9, wherein the processor is further to:
determine whether a combination of the first ratio and the third ratio meets or exceeds a threshold;
perform a first action responsive to determining that the combination meets or exceeds the threshold; and
perform a second action responsive to determining that the combination fails to meet or exceed the threshold.

11. The computing device of claim 8, wherein the processor is further to:
determine a first portion of the media item that comprises music and a second portion of the media item that does not comprise music, wherein the respective digital fingerprints are generated for the first portion of the media item and not for the second portion of the media item.

12. The computing device of claim 8, wherein the processor is further to:
determine whether the first ratio exceeds a threshold; and
remove the media item from a service responsive to a determination that the first ratio exceeds the threshold.

13. The computing device of claim 8, wherein the processor is further to:
determine whether the first ratio exceeds a threshold;
determine the first resource allocation responsive to determining that the first ratio meets or exceeds the threshold; and
determine a second resource allocation responsive to determining that the first ratio fails to meet or exceed the threshold.

14. A non-transitory computer readable medium comprising instructions that, when executed by a processor, cause the processor to perform operations comprising:
receiving a media item comprising a plurality of works;
identifying a first work of the plurality of works in the media item, wherein the first work is associated with a first media content owner, and wherein identifying the first work comprises:
dividing the media item into a plurality of segments;

generating, for one or more segments of the plurality of segments, a respective digital fingerprint from the segment;

comparing each respective digital fingerprint to a plurality of stored digital fingerprints, wherein each of the plurality of stored digital fingerprints is associated with a respective known work;

determining that one or more of the respective digital fingerprints match one or more stored digital fingerprints of the plurality of stored digital fingerprints; and determining a known work associated with the one or more stored digital fingerprints, wherein the first work corresponds to the known work;

determining a first value based on a first length of the first work;

determining a second value based on a second length of the media item;

determining a third value based on a third length of the known work;

determining a first ratio of the first value to the second value;

determining a second ratio of the first value to the third value; and determining a first resource allocation to the first media content owner associated with the first work based at least in part on the first ratio, wherein the first resource allocation is weighted based on the first ratio and the second ratio.

15. The non-transitory computer readable medium of claim 14, further comprising additional instructions that further cause the processor to perform operations comprising:

identifying a second work of the plurality of works;

determining a fourth value based on a fourth length of the second work;

determining a third ratio of the fourth value to the second value; and determining a second output based at least in part on the third ratio.

16. The non-transitory computer readable medium of claim 15, further comprising additional instructions that further cause the processor to perform operations comprising:

determining whether a combination of the first ratio and the third ratio meets or exceeds a threshold;

performing a first action responsive to determining that the combination meets or exceeds the threshold; and performing a second action responsive to determining that the combination fails to meet or exceed the threshold.

17. The non-transitory computer readable medium of claim 14, further comprising additional instructions that further cause the processor to perform operations comprising:

determining a first portion of the media item that comprises music and a second portion of the media item that does not comprise music, wherein the respective digital fingerprints are generated for the first portion of the media item and not for the second portion of the media item.

18. The non-transitory computer readable medium of claim 14, further comprising additional instructions that further cause the processor to perform operations comprising:

determining whether the first ratio exceeds a threshold; and removing the media item from a service responsive to the determination that the first ratio exceeds the threshold.

19. The non-transitory computer readable medium of claim 14, further comprising additional instructions that further cause the processor to perform operations comprising:

determining whether the first ratio exceeds a threshold;

determining the first resource allocation responsive to determining that the first ratio meets or exceeds the threshold; and determining a second resource allocation responsive to determining that the first ratio fails to meet or exceed the threshold.

* * * * *